US006888643B1

(12) United States Patent  
Grimes (10) Patent No.: US 6,888,643 B1  
(45) Date of Patent: May 3, 2005

(54) METHOD AND SYSTEM FOR PRINTING DOCUMENTS TO A REUSABLE MEDIUM

(75) Inventor: Benjamin Russell Grimes, Zebulon, NC (US)

(73) Assignee: International Business Machines Corporation, Armonk, NY (US)

( * ) Notice: Subject to any disclaimer, the term of this patent is extended or adjusted under 35 U.S.C. 154(b) by 1029 days.

(21) Appl. No.: 09/595,936

(22) Filed: Jun. 16, 2000

(51) Int. Cl.$^7$ .............................................. G06R 15/00
(52) U.S. Cl. ...................................... 358/1.15; 358/1.1
(58) Field of Search ................................ 358/1.15, 1.1, 358/1.16, 1.6, 402, 403; 707/10, 200, 204; 715/527

(56) References Cited

U.S. PATENT DOCUMENTS

| | | | |
|---|---|---|---|
| 4,855,725 A | | 8/1989 | Fernandez |
| 5,467,102 A | | 11/1995 | Kuno et al. |
| 5,475,398 A | | 12/1995 | Yamazaki et al. |
| 5,696,982 A | | 12/1997 | Tanigawa et al. |
| 5,703,624 A | | 12/1997 | van Kruistum |
| 5,761,485 A | | 6/1998 | Munyan |
| 5,909,207 A | | 6/1999 | Ho |
| 5,914,707 A | | 6/1999 | Kono |
| 6,199,073 B1 | * | 3/2001 | Peairs et al. ................. 707/204 |
| 2003/0174357 A1 | * | 9/2003 | Lester et al. ................ 358/1.15 |

OTHER PUBLICATIONS eBook Reading Devices, 3 pages. Retrieved Apr. 5, 2000 from the World Wide Web: http://www.ebooknet.com/topic.jsp?topic=Home%3AReading+Technology.
Robb, J., Digital Books: Good Enough to Curl up With?, PCWorld.com, Nov. 1998, 2 pages; Retrieved Apr. 5, 2000 from the World Wide Web: http://www.pcworld.com/top400/article/0,1361,8233,00.html.
Everybook, Inc., Frequently Asked Questions, 2. How does the EB Dedicated™ Reader work?; Retrieved Apr. 5, 2000 from the World Wide Web: http://www.everybook.net/FAQS2.HTML.
Electronic books and secure eBook–based document distribution solutions, The SoftBook Reader, SoftBook Press, 1 page. Retrieved Apr. 5, 2000 from the World Wide Web: http://www.softbook.com/enterprise/reader.asp.
Electronic books and secure eBook–based document distribution solutions, SoftBook Readers 250e specifications, SoftBook Press, 2 pages. Retrieved Apr. 5, 2000 from the World Wide Web: http://www.softbook.com/enterprise/specifications.asp.
Electronic books and secure eBook–based document distribution solutions, SoftBook Personal Publisher, Softbook Press, 2 pages. Retrieved Apr. 5, 2000 from the World Wide Web: http://www.softbook.com/enterprise/personal.asp.

(Continued)

*Primary Examiner*—Arthur G. Evans
(74) *Attorney, Agent, or Firm*—Dillon & Yudell, LLP (57) ABSTRACT

A paperless printing system for storing and displaying documents produced by print facilities of a data processing system comprises a docking station in communication with a printer port of the data processing system. The docking station receives, from the data processing system, printer data that defines one or more documents. A portable viewer that is removably coupled with the docking station receives the printer data from the docking station. A rewritable memory within the portable viewer stores the printer data. One or more controls on the portable viewer respond to operator manipulation by causing the portable viewer to utilize the printer data to display a desired portion of the one or more documents at least when the portable viewer is not coupled with the docking station and not in communication with the data processing system. In an illustrative embodiment, the system also includes a printer driver in the data processing system that is associated with the paperless printer. An operating system in the data processing system responds to an invocation of a print function of an application by utilizing the printer driver to generate the printer data.

19 Claims, 5 Drawing Sheets

OTHER PUBLICATIONS

Electronic books and secure eBook-based document distribution solutions, SoftBook Press home page, SoftBook Press, 2 pages. Retrieved Apr. 5, 2000 from the World Wide Web: http://www.softbook.com/index.asp.

Levenger—Regular Item Order Page, 2 pages. Retrieved Apr. 5, 2000 from the World Wide Web: http://levenger.com/Shop/ItemOrder.asp?Title=Rocket+eBook&RootSku=EA0295.

Levenger—Environment Image, 1 page. Retrieved Apr. 5, 2000 from the World Wide Web: http://levenger.com/Shop/AdditionImage.asp?Title=Rocket+eBook.

Technical Details—Rocket eBook, 5 pages. Retrieved Apr. 5, 2000 from the World Wide Web: http://www.rocket-ebook.com/Products/Faq/technical.html.

* cited by examiner

METHOD AND SYSTEM FOR PRINTING DOCUMENTS TO A REUSABLE MEDIUM

BACKGROUND OF THE INVENTION

1. Technical Field

The present invention relates in general to data processing systems and, in particular, to the utilization of data processing systems to produce human readable output. Still more particularly, the present invention relates to printing from a data processing system to a reusable medium.

2. Description of the Related Art

Conventional personal data processing systems (e.g., "personal computers" or "PCs") typically include a monitor that displays output and software applications (such as word processors) that provide for the display of data files containing text and/or graphics. Such applications typically also include print functionality that allows paper documents to be generated from those data files, provided that a printer is connected to the PC.

For example, a typical word processing application utilizes a graphical user interface (GUI) that includes (1) a viewing panel within which a document may be displayed and (2) a toolbar with selectable buttons for invoking commonly used functions. Typically, one of the toolbar buttons represents a print function. When invoked, the print function displays a window within which various print settings (such as number of copies and destination printer) may be altered from default settings. After the settings are altered or not, as desired for a particular print job, an "OK" or "PRINT" button is selected from the print settings window to dispatch the document to the printer. The operating system then detects that a print job has been submitted, determines which printer has been selected, and utilizes a corresponding printer driver to generate print data acceptable to the destination printer. The print data is transmitted to the printer, which converts the print data into an image on paper. Once all of the print data has been successfully processed, the printer transmits an appropriate status signal (i.e., an acknowledgment or is "ACK") to the operating system, via the printer driver. Further, if the printer runs out of paper before the job is finished, the printer transmits a status signal so indicating to the operating system, via the printer driver.

While people have been utilizing data processing systems to generate paper documents for years, and applications for conventional PCs typically include print functions that are quite simple to activate, printing documents to paper still entails a number of disadvantages. For example, even though a person might only need a document for a few minutes, the paper of a conventional printed document can only be recycled at the expense of significant additional resources. Consequently, utilizing paper to print documents that are needed for only a brief span of time is wasteful. In addition, if a document contains sensitive information, at some point in time it may be deemed necessary to render the document unreadable (e.g., by shredding the document), and this post-printing activity requires additional effort. Also, large documents (such as technical reference manuals, encyclopedias, etc.) can be readily stored in conventional data processing systems but are unwieldy to handle and difficult to transport when reproduced on paper.

One approach to making a document more easily transportable is to utilize a "print to disk" (or "print to file") function. Such functions may be utilized to store a digital copy of a desired documented on a floppy disk, and the user may transport that disk ease. An essential characteristic of any process that might properly be considered "printing", however, is that the process generates output that is visible on the output medium without further resort to equipment other than the output medium. But the documents that result from functions like "print to disk" are not visible without further resort to a data processing system, since the output medium (i.e., the floppy disk) is incapable of displaying the data. Therefore, functions like "print to disk" are not actually print functions. Furthermore, few users know how to use functions like "print to disk," compared to the number of users who know how to use (and have used) standard print functions.

A need therefore exists for a system and a method for printing documents to a medium that can be reused repeatedly, with little or no effort required to prepare the medium for reuse. In addition, it would be beneficial if the system and the method allowed large amounts of information to be transported and viewed with ease. Yet additional advantages would be realized if the system and the method allowed individuals to utilize standard print functions to dispatch documents to the output medium, rather than requiring users to learn how to utilize a new or unfamiliar function for dispatching documents.

SUMMARY OF THE INVENTION

To eliminate the disadvantages of conventional techniques for producing documents, the present invention introduces a paperless printing system. That paperless printing system comprises a docking station in communication with a printer port of a data processing system. The docking station receives, from the data processing system, printer data that defines one or more documents. A portable viewer removably couples with the docking station to receive the printer data from the docking station. In one embodiment, a rewritable memory within the portable viewer stores the printer data at least when the portable viewer is not coupled with the docking station and not in communication with the data processing system. One or more controls on the portable viewer respond to operator manipulation by causing the portable viewer to utilize the printer data to display a desired portion of the one or more documents.

In an illustrative embodiment, the system also includes a printer driver in the data processing system that is associated with the paperless printer. An operating system in the data processing system responds to an invocation of a print function of an application by utilizing the printer driver to generate the printer data. Thus, the printer driver allows an operator to utilize standard print functions of one or more applications of the data processing system to dispatch documents to the portable viewer.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
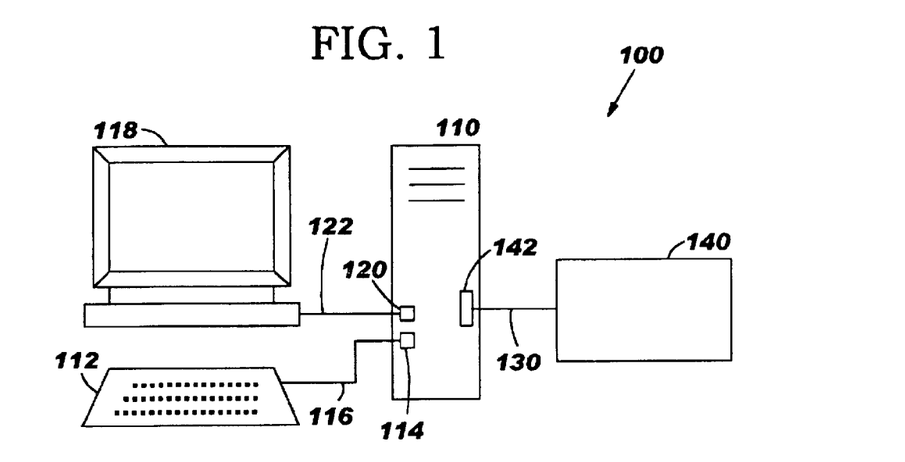
FIG. 1 depicts an illustrative embodiment of a data processing system with facilities in accordance with the present invention for generating portable documents without using paper.

With reference now to the figures and in particular with reference to FIG. 1, there is depicted a data processing system 100 with illustrative facilities, in accordance with the present invention, for generating portable documents without using paper. Data processing system 100 has a system unit 110 that contains and protects internal data processing components (not illustrated), including storage facilities and processing resources. The storage facilities include random access memory (RAM) and, preferably, one or more disk drives containing software, such as an operating system and a variety of application programs. The processing resources include one or more central processing units in communication with the data storage facilities.

System unit 110 also features a number of input and output (I/O) ports that allow the internal components to communicate with external components. In particular, a conventional keyboard 112 is connected to a keyboard port 114 of system unit 110 via a keyboard cable 116. Also, a conventional display device 118, such as a Super Video Graphics Array (SVGA) monitor, is connected to a display port 120 via a display cable 122. In addition, a paperless printer 140 is connected to a 25-pin female printer port 142 of system unit 110 via a parallel printer cable 130. For the purposes of this document, a printer is a computer peripheral that (1) an operating system identifies as a printer to an application program, for purposes of allowing a user of that application program to select among available printers, and that (2) produces a visible image of a document on a portable medium as a result of execution of a print function of that application. As explained below, paperless printer 140 has those characteristics; thus, paperless printer 140 is a printer.

Figure 2:
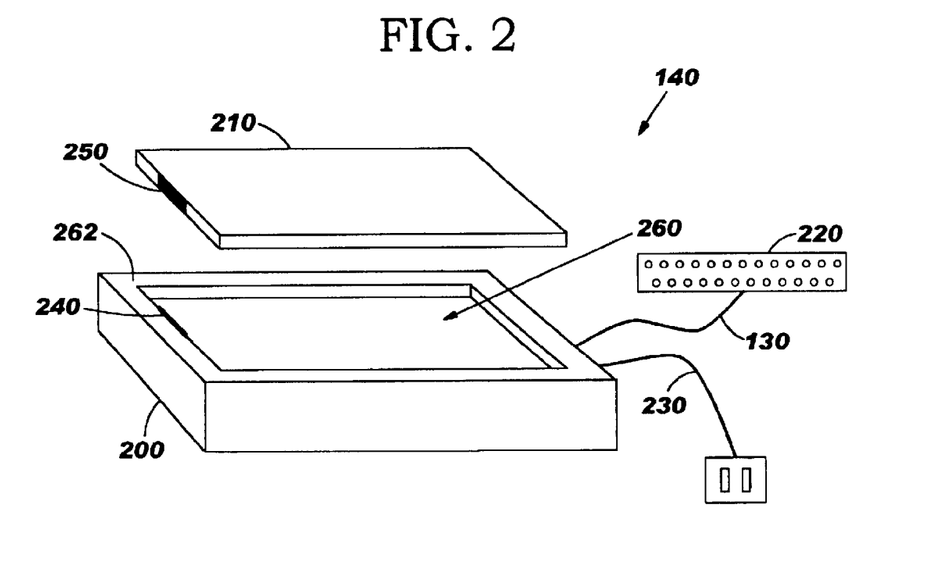
FIG. 2 illustrates an exemplary embodiment of the paperless printer of FIG. 1.

Referring now to FIG. 2, the structure of paperless printer 140 is depicted in greater detail. As shown, paperless printer 140 of the illustrative embodiment includes a docking station 200 and a portable viewer 210 that removably couples with docking station 200. Connecting docking station 200 and system unit 110 is parallel printer cable 130. Specifically, parallel printer cable 130 has a 25-pin male connector 220 that plugs into printer port 142. Docking station 200 also has a power cable 230 that plugs into a conventional alternating current (AC) outlet. Docking station 200 and portable viewer 210 communicate with each other via a display interface 240 (of docking station 200) and a dock interface 250 (of portable viewer 210), which interfaces contact each other when docking station 200 and portable viewer 210 are coupled.

In the illustrative embodiment, portable viewer 210 has a generally rectangular perimeter and thickness of approximately 0.5 inches, and docking station 200 features an upper surface 262 with a substantially rectangular recess 260 adapted to partially receive portable viewer 210. To couple portable viewer 210 and docking station 200, portable viewer 210 is nested securely into recess 260. Recess 260 is sufficiently shallow, however, that a portion of at least one edge of portable viewer 210 protrudes above upper surface 262 when portable viewer 210 and docking station 200 are coupled. The protruding edge provides a fingerhold that is used to remove portable viewer 210 from docking station 200. In alternative embodiments, however, coupling and decoupling might be accomplished in other ways. For example, portable viewer 210 might nest entirely within recess 260, and upper surface 262 might include one or more indentation that provide access to an edge of portable viewer 210. Alternatively, an eject mechanism could be utilized to effect decoupling.

Figure 3:
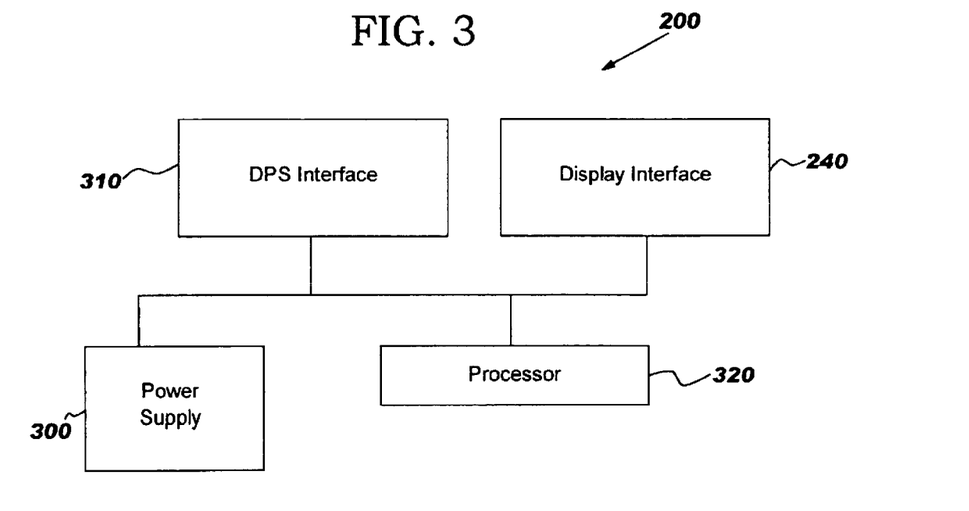
FIG. 3 depicts a block diagram of the docking station of FIG. 2.

With reference now to FIG. 3, there is depicted a block diagram of docking station 200. As shown, docking station 200 includes four major collections of components: a power supply 300, a data processing system (DPS) interface 310, a processor 320, and display interface 240. Preferably, power supply 300 utilizes power cable 230 to obtain an AC from an external source (such as a wall outlet) and utilizes conventional technology to convert the AC into a direct current (DC) with a predetermined voltage for use by the other components of docking station 200. DPS interface 310 utilizes parallel printer cable 130 to provide a communication path between docking station 200 and printer port 142. When engaged with dock interface 250, in addition to providing a data path between docking station 200 and portable viewer 210 (as explained above), display interface 240 serves as a conduit to power supply 300 to provide portable viewer 210 with an auxiliary source of power. Processor 320 obtains power from power supply 300 and helps to supervise the delivery of power to portable viewer 210 and the sharing of data between docking station 200 and portable viewer 210.

Figure 4:
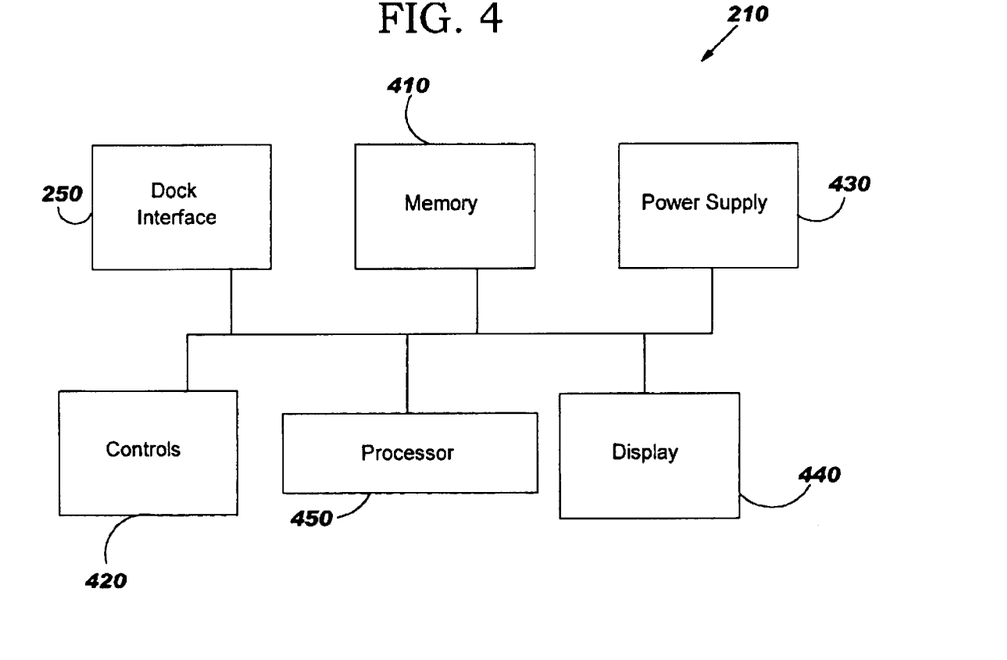
FIG. 4 illustrates a block diagram of the portable viewer of FIG. 2.

Referring now to FIG. 4, a block diagram of portable viewer 210 is illustrated. As depicted, portable viewer 210 includes dock interface 250 for communicating with, and receiving power from, docking station 200. Also included is a memory 410 for storing received data and a set of controls 420 for operator input. For instance, controls 420 may be used to page back and forth through desired portions of a stored document. In addition, portable viewer 210 includes a portable power supply 430 and an image medium 440, as well as a processor 450. In the illustrative embodiment, a battery of one or more portable, rechargeable, energy cells serve as portable power supply 430; controls 420 are switches set in the housing of portable viewer and linked to processor 450; and image medium 440 is a liquid-crystal display (LCD). However, in alternative embodiments different technologies, such as plasma display panel (PDP) technology, can be utilized for image medium 440. Also, image medium 440 can be a touch screen, with some or all of controls 420 being displayed within image medium 440 or within a touch screen that is distinct from image medium 440. Image medium 440 is preferably a rectangle of approximately 8.5 by 11 inches, so that when a document formatted for standard-sized sheets of paper is being viewed, the operator can view an entire page of the document without scrolling the image, reducing the proportional size of the image (i.e., "zooming out"), or otherwise manipulating the image. Nevertheless, in the illustrative embodiment, portable viewer 210 does provide image manipulation features (such as zoom in or out, scroll up or down, and page up or down) that may be operated utilizing controls 420.

As described in greater detail below with reference to FIGS. 6 and 7, processor 450 is utilized to manage the operation of portable viewer 210, coordinating the functions of the other components in accordance with operator input received directly from controls 420 or in directly in the form of printer data received from system unit 110 via docking station 200. For example, when portable viewer 210 is coupled with docking station 200, processor 450 automatically determines whether portable power supply 430 is fully charged and, if not, utilizes power obtained from docking station 200 via dock interface 250 to recharge portable power supply 430.

Figure 5:
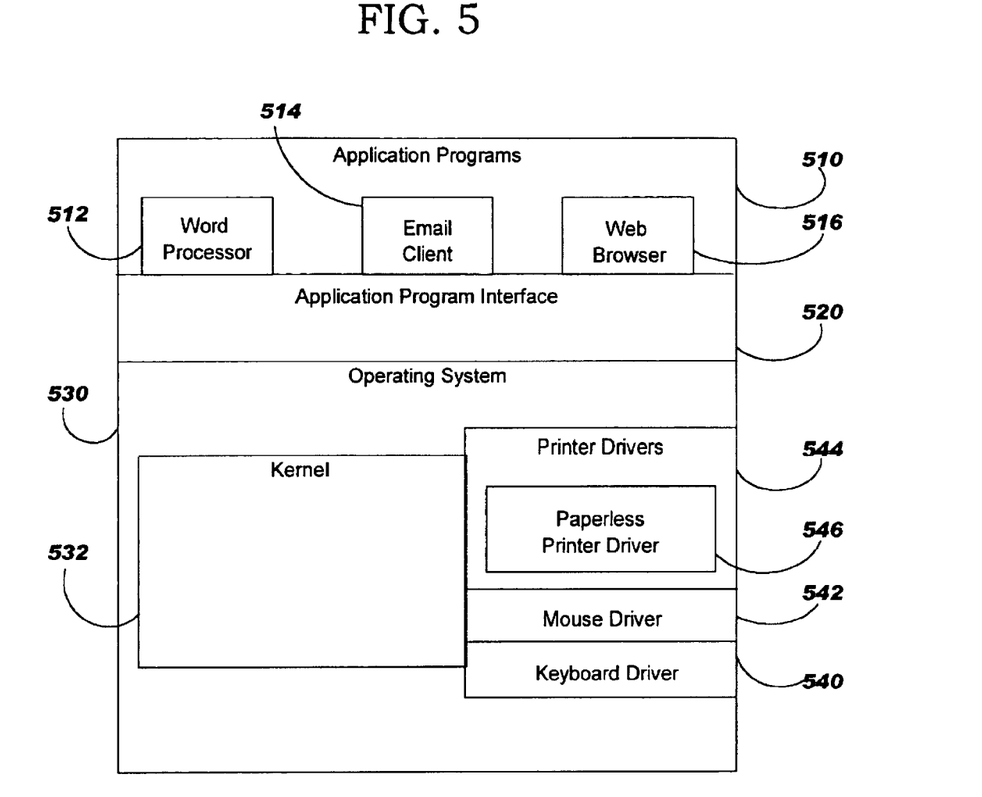
FIG. 5 depicts a block diagram of exemplary software within the data processing system of FIG. 1 for supporting a paperless printer according to the present invention.

With reference now to FIG. 5, there is depicted a layer diagram of exemplary software within system unit 110 for supporting a paperless printer according to the present invention. At the highest level of the diagram are the application programs 510, including, for example, a word processor 512, a web browser 514, and an E-mail client 516. At the intermediate level is an application program interface (API) 520, through which application programs 510 request services from the operating system 530. Operating system 530, which occupies the lowest level of the diagram, manages the operations of data processing system 100 by performing duties such as resource allocation, task management, and error detection. Included in operating system 530 is a kernel 532 that manages the memory, files, and peripheral devices of data processing system 100.

The lowest level also includes device drivers, such as a keyboard driver 540 and a mouse driver 542, and kernel 532 utilizes the device drivers to manage input from and output to peripheral devices. In particular, in the illustrative embodiment operating system 530 includes a set of printer drivers 544, including a printer driver 546 that is designed to produce printer data for paperless printer 140. For the purposes of this document, the term "printer driver" is defined as set forth in Microsoft Press Computer Dictionary, Third Edition, 1997, p. 380. To wit, a printer driver is > [a] software program designed to enable other programs to work with a particular printer without concerning themselves with the specifics of the printer's hardware and internal "language." Application programs can communicate properly with a variety of printers by using printer drivers, which handle all of the subtleties of each printer so that the application program doesn't have to. Today [GUIs] offer their own printer drivers, eliminating the need for an application that runs under the interface to have its own printer driver.

In the illustrative embodiment, operating system 530 serves the above-described function of providing a GUI. According to the present invention, printer driver 546 is a printer driver, providing an interface between operating system 530 and paperless printer 140. Specifically, printer driver 546 accepts printing commands from operating system 530 and returns printer status signals to operating system 530.

For the purposes of this document, a printing command is a command issued by an operating system in response to invocation of a print function of an application (as opposed to commands issued by an operating system in response to invocation of application functions such as "save as" and "export to"). Also, for the purposes of this document, a printer status signal is a data value that is interpreted by an operating system as relating to a peripheral device that the operating system classifies as a printer.

When printing commands are received, printer diver 546 translates those commands into the specific control signals required to operate paperless printer 140, and when status signals are received from paperless printer 140, printer driver 546 translates those signals into the printer status signals that operating system 530 is capable of processing. For example, when a document is dispatched to paperless printer 140, printer driver 546 translates the document from the format that embodies the document within system unit 110 into a format suitable for transmission to paperless printer 140.

Furthermore, in addition to printer driver 546, printer driver set 544 may include printer drivers for other printers (e.g., for network printers connected to system unit 110 via a network connection). To take advantage of a situation in which multiple printers are installed, each of application programs 510 preferably includes a mechanism by which an operator can direct different documents to different printers.

For example, an operator may be utilizing word processor 512 to view personal notes that have been drafted in preparation for a business meeting. Alternatively, the operator may be viewing or editing a different type of report, utilizing Web browser 514 to view a Web page, utilizing E-mail client 514 to read or composing an E-mail message, or viewing or changing any other displayable data using any other appropriate application program. An advantage of the paperless printer of the present invention is that each different application need not be modified to take advantage of paperless printing functionality. Instead, operators may produce paperless documents from existing applications by simply utilizing standard printing operations and facilities of those applications.

For instance, an operator that is viewing the personal notes within display device 118 may decide to make a portable copy of those notes to bring to the meeting for personal reference. To produce the portable copy (i.e., a copy that may be transported to a location remote from system unit 110 and viewed at that location without further resort to system unit 110 or any other system unit), the operator may simply issue a print command that directs output to paperless printer 140. For example, word processor 512 may present a function menu and/or a toolbar within display device 118, in conjunction with the personal notes, and the operator may issue the print command by utilizing a pointing device (such as a mouse) to select a "print" icon of the toolbar or a "print" menu item of the function menu. In addition, word processor 512 preferably provides the operator with a menu of printing options which allow the operator to specify the printer to which the document should be transmitted.

In the illustrative embodiment, the mechanism for utilizing different printers for different print jobs is supported by features of operating system 530 that (1) distinguish printer drivers from device drivers for other types of devices, (2) maintain a list of installed printers, and (3) associate an appropriate printer driver and output port with each installed printer. That mechanism is further support by features of API 520 that allow application programs 510 to obtain a list of installed printers from operating system 530. Consequently, when an operator selects a print function of word processor 512 (for example), word processor 512 might display a list box allowing the operator to select a desired printer from the list of installed printers. Once a printer has been selected, the printer driver associated with the selected printer is used to generate the output (i.e., the printer data) to be sent to the printer port associated with that printer. Thus, once paperless printer 140 has been installed (i.e., connected to printer port 142 and associated, within operating system 530, with printer driver 546 and printer port 142), documents can be sent to paperless printer 140 from application programs 510 utilizing standard print functions of those applications.

Moreover, operating system 530 need not be altered to support those printing functions; the addition of printer driver 546 is all that is required to make operating system 530 fully supportive of paperless printer 140.

Moreover, in an alternative embodiment of the present invention, paperless printer 140 may include logic for translating printer data generated by a printer driver other than printer driver 546 into the printer data that printer driver 546 would have generated. Thus, if operating system 530 were to include a "generic" printer driver (for example), that printer driver could be utilized to produce printer data for this alternative embodiment of the paperless printer, and no special printer driver need be added to operating system 530.

Figure 6:
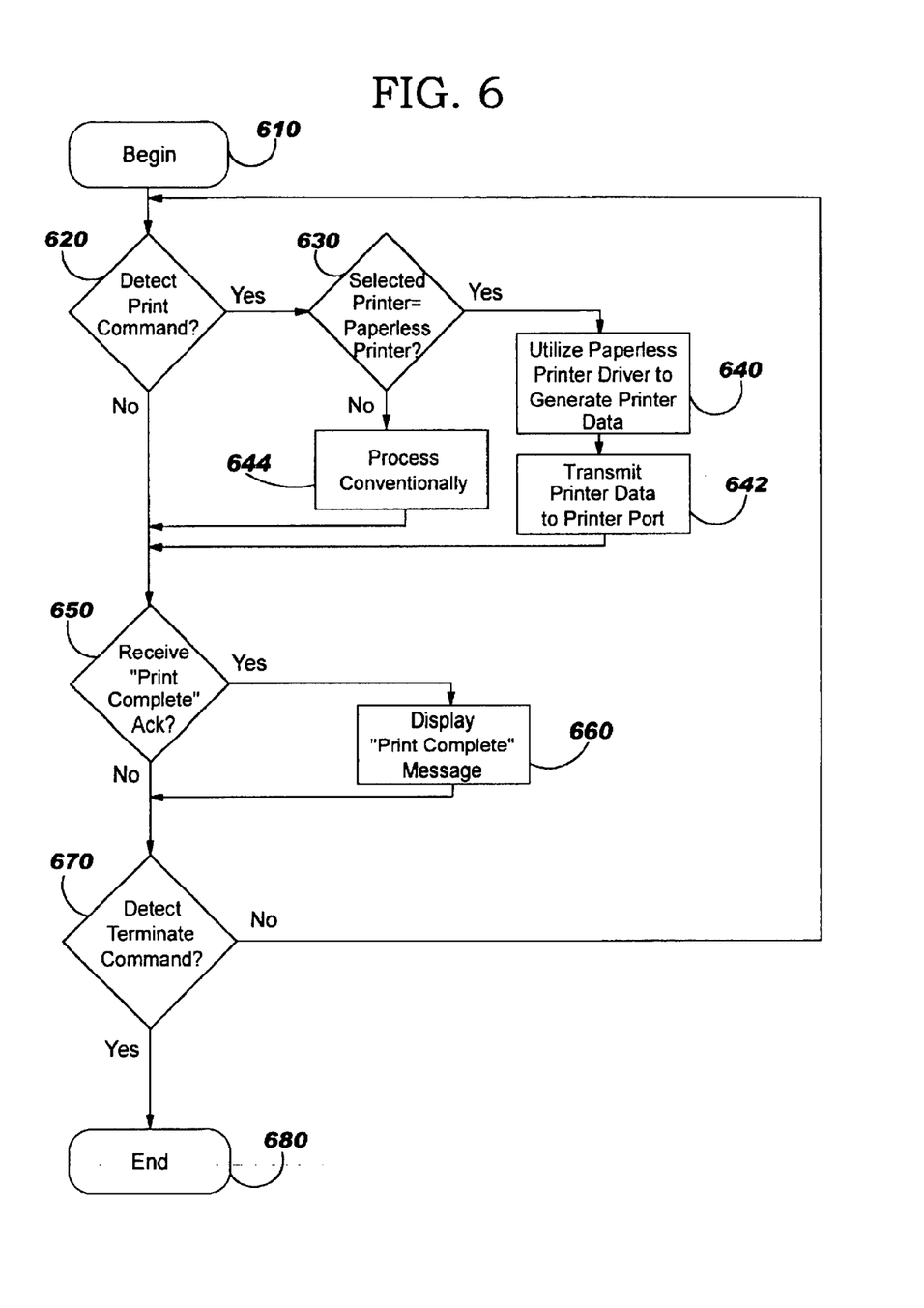
FIG. 6 illustrates a flowchart of an exemplary process, according to the present invention, for dispatching documents from a data processing system to a paperless printer.

Referring now to FIG. 6, there is illustrated a flowchart of an exemplary process, according to the present invention, for dispatching documents from a data processing system to a paperless printer. The illustrative process begins at block 610 with operating system 530 managing the operations (including the printing functions) of data processing system 100. The process then enters a main loop for managing print functions by determining whether an operator has issued a print command, as shown at block 620. If a print command is detected, operating system 530 then determines whether the printer that was selected (either explicitly or by default) for the subject print job is paperless printer 140, as illustrated at block 630. If the selected printer is paperless printer 140, the process passes to block 640, which depicts operating system 530 utilizing printer driver 546 to generate printer data embodying the subject document, and then to block 642, which depicts operating system 530 transmitting the generated printer data to the printer port that operating system 530 associates with paperless printer 140 (which, in this case, is printer port 142). However, if it is determined at block 630 that a printer other than paperless printer 140 has been selected, the print job is simply processed conventionally, as depicted at block 644.

Then, whether the print job utilizes printer driver 546 or is processed conventionally, (or if no print command is detected at block 620,) the process passes to block 650, which shows operating system 530 determining whether an acknowledgment (ack) signal has been received signifying that the printer data was transmitted successfully. If so, operating system 530 displays a message in display device 118 informing the operator the printing is complete, as illustrated in block 660. Otherwise, no message box is displayed.

In either case, however, the process then passes to block 670, which shows operating system 530 determining whether the operator is terminating operation of system unit 110, for example by selecting a "shut down" menu item. If a terminate command is detected, the process of FIG. 6 ends, as shown at block 680. Otherwise, the main loop is reentered, beginning at block 620 with a determination of whether a new print command has been issued.

Figure 7:
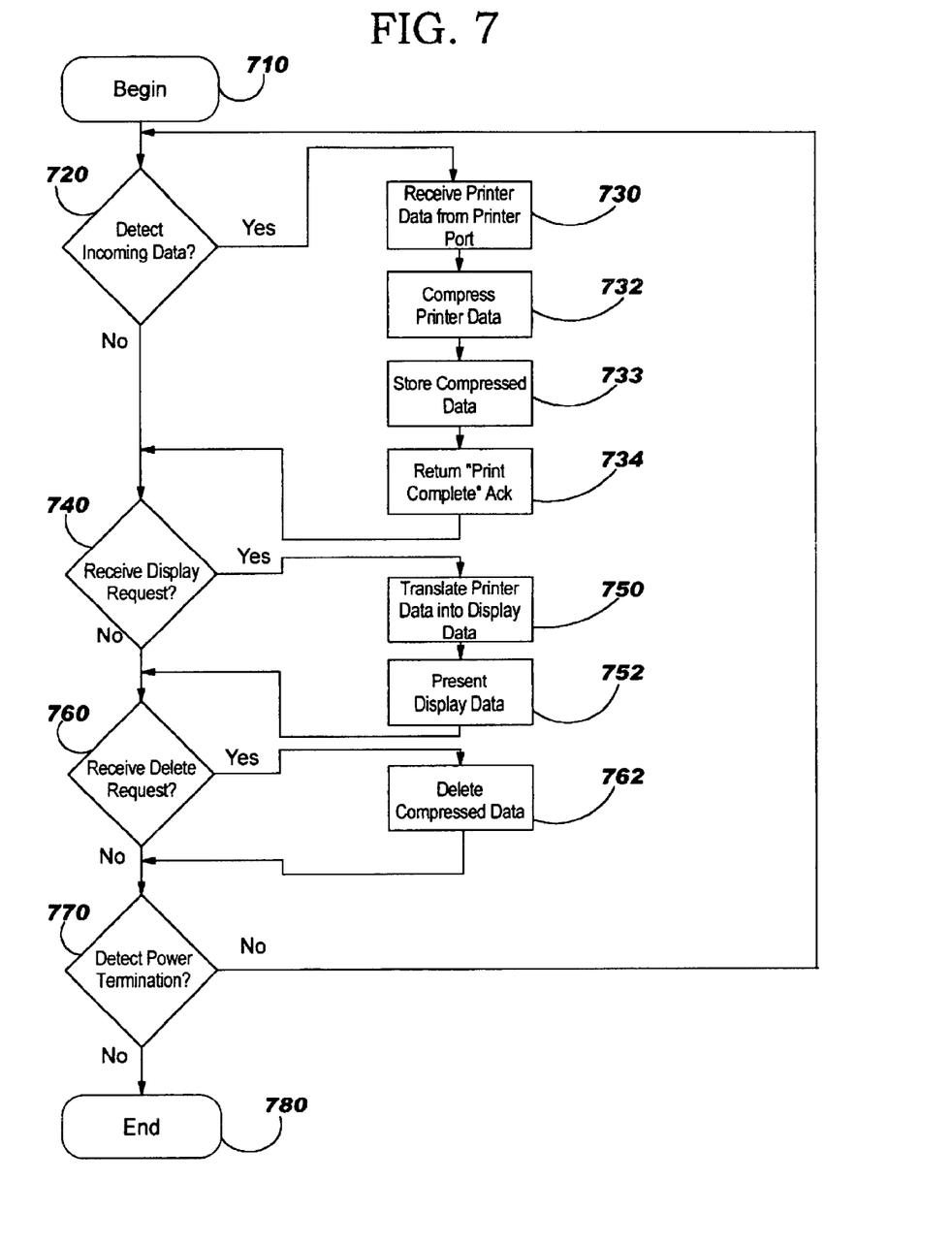
FIG. 7 depicts a flowchart of an illustrative process, according to the present invention, for receiving, storing, displaying, and deleting dispatched documents.

With reference now to FIG. 7, there is depicted a flowchart of an illustrative process, according to the present invention, for receiving, storing, displaying, and deleting dispatched documents. The illustrated process begins at block 710 with paperless printer entering an input loop, beginning at block 720. As shown at block 720, paperless printer 140 then determines, by reference to DPS interface 310, whether system unit 110 is attempting to transmit printer data to paperless printer 140. In one embodiment, the determination is made by processor 320 of docking station 200. In a preferred embodiment, however, docking station 200 merely passes the printer data from DPS interface 310 to portable viewer 210 via display interface 240, and the determination is made by processor 450 of portable viewer 210.

If it is determined that printer data is being transmitted to paperless printer 140, that printer data is then received, compressed (preferably), and stored within memory 410, as depicted at blocks 730, 732, and 734, respectively. Preferably, the compression of the printer data into compressed data is performed by processor 450. However, the compression might alternatively be performed by processor 320, with the compressed data being forwarded via display interface 240 to be stored in portable viewer 210, or the compression could be omitted altogether, at the expense of reducing the effective document storage capacity of the portable viewer. Once all of the printer data for a document has been received, an ACK so indicating is returned to system unit 110 via printer port 142. The ACK may be produced either by processor 320 or, preferably, by processor 450.

After the ACK is transmitted, or if it is determined at block 720 that printer data is not being transmitted to paperless printer 140 by system unit 110, paperless printer 140 determines (as shown at block 740) whether an operator has utilized controls 420 to request the display of a stored document. If so, processor 450 retrieves the compressed data that corresponds to the requested document (or to a specified portion thereof), decompresses the retrieved data, and translates the decompressed data into display data, as illustrated at block 750. The display data is then utilized to reproduce the desired document (or the specified portion thereof) as an image within image medium 440, as depicted at block 752.

After the image is displayed, or if it is determined at block 740 that no request for displaying data has been entered via controls 420, the process passes to block 760, which illustrates processor 450 determining whether an operator has utilized controls 420 to request the deletion of a stored document. If deletion of a document has been requested, processor 450 removes the compressed data relating to that document from memory 410, as shown at block 762.

After the delete request has been processed, or if it is determined at block 760 that no delete request has been received, the process passes to block 770, which depicts a determination of whether portable viewer 210 is being powered down. If so, the process ends, as shown at block 780. Otherwise, the input loop resumes with another determination of whether printer data is being dispatched to paperless printer 140, as shown at block 720.

Thus, conventional printing features of existing applications can be utilized to dispatch documents to portable viewer 210, and portable viewer 210 can then be removed from docking station 200 and utilized remotely from system unit 110 to view the dispatched document. Furthermore, in the illustrative embodiment, memory 410 provides sufficient storage to contain printer data defining many display pages of data, and paperless printer 140 is capable of holding many documents simultaneously. Also, the storage capacity can be tailored for different requirements by providing a range of portable viewer models with different storage capacities and corresponding prices. In the illustrative embodiment, however, portable viewer 210 has sufficient memory capacity to store data defining hundreds of display pages, thereby allowing an operator to transport and view large amounts of information much more easily than is possible with paper documents.

In addition to the features described above, paperless printer 140 emulates conventional, paper-consuming printers in a number of other ways. For instance, if a document is dispatched to paperless printer 140 while no portable viewing device is coupled to docking station 200, processor 450 returns a status signal to printer driver 546 that results in a "paper out" message being displayed on display device 118. An operator may then respond by coupling portable viewer 210 to docking station 200. Likewise, paperless printer 140 causes a "paper-out" message to be displayed when portable viewer 210 lacks sufficient remaining capacity to store the entirety of a new document that is being dispatched (for example, as a result of one or more previously received documents occupying the needed storage). An operator may then utilize the delete function described above to remove one or more of the earlier documents, thereby increasing the available storage. Alternatively, the operator might simply replace portable viewer 210 with a different portable viewer containing more unused storage.

In conclusion, as has been described, the present invention introduces a paperless printer that makes it possible to produce paperless documents by simply utilizing familiar print commands of conventional application programs. No special hardware or software interfaces need be used to dispatch documents to the paperless printer; instead, a standard printer cable and a standard printer driver designed for the paperless printer are used. Furthermore, the operator need not manually convert documents into any special format. For example, the operator need not learn how to utilize any special functions, such as functions for "exporting" a document from one application for utilization by another application (or comparable "save as" functions). Instead, the present invention allows the operator to utilize simple and familiar printing functionality.

In addition, this paperless printer provides a portable viewer that is utilized in lieu of paper to view documents while away from the data processing system. For instance, an operator might dispatch the following documents from a data processing system to a portable viewer: an E-mail message from a customer, a file that was attached to the E-mail message, a map with instructions for driving from an airport to the customer's offices, a collection of reference manuals, and a novel. The operator could then remove the portable viewer from its docking station, take the portable viewer on a plane, read the novel while on the plane, utilize the map to find the customer's offices, and consult the E-mail attachment and reference manuals while at the customer site. Thus, the portable viewer provides access to necessary or desired information while minimizing the inconveniences associating with transporting the information to a desired location and producing the information in readable or viewable form.

While the invention has been particularly shown and described with reference to a preferred embodiment, it will be understood by those skilled in the art that various changes in form and detail may be made therein without departing from the spirit and scope of the invention.

What is claimed is:

1. A method for storing and displaying documents, said method comprising:

receiving, at a docking station of a paperless printer, printer data from a printer port of a data processing system, wherein said printer data defines one or more documents;

in response to receipt of said printer data, transmitting said printer data from said docking station to a portable viewer of said paperless printer;

storing said printer data in a rewritable memory of said portable viewer;

removing said portable viewer from said docking station;

thereafter, detecting operator manipulation of one or more controls of said portable viewer; and in response to said detection, utilizing said printer data to display a desired portion of said one or more documents within said portable viewer.

2. The method of claim 1, further comprising the preceding steps of:

detecting, at said data processing system, an invocation of a print function of an application, wherein said invocation involves a printer driver that is associated with said paperless printer; and in response to said invocation, utilizing said printer driver to generate said printer data.

3. The method of claim 1, wherein said step of receiving said printer data from said printer port comprises receiving said printer data from a parallel port of said data processing system.

4. The method of claim 1, wherein said step of storing said printer data in said rewritable memory comprises storing printer data defining at least twenty display pages in said rewritable memory.

5. The method of claim 1, further comprising:

detecting operator activation of erase facilities of said portable viewer; and in response, removing operator-identified printer data from said portable viewer.

6. The method of claim 1, wherein said step of storing said printer data comprises:

utilizing a processor within said portable viewer to compress said printer data into compressed data; and storing said compressed data in said rewritable memory.

7. The method of claim 1, wherein said step of transmitting said printer data to said portable viewer comprises:

utilizing a processor within said docking station to compress said printer data into compressed data; and transmitting said compressed data to said portable viewer.

8. The method of claim 1, wherein:

said portable viewer includes one or more portable energy cells; and said step of storing said printer data in said rewritable memory comprises utilizing said one or more portable energy cells to maintain said printer data in said rewritable memory at least when said portable viewer is not coupled to said docking station.

9. A paperless printing system for storing and displaying documents produced by print facilities of a data processing system, said paperless printing system comprising:

a docking station in communication with a printer port of a data processing system, such that said docking station receives printer data from said data processing system, wherein said printer data defines one or more documents;

a portable viewer that removably couples with said docking station to receive said printer data from said docking station when coupled thereto;

a rewritable memory within said portable viewer that stores said printer data; and one or more controls on said portable viewer that, responsive to operator manipulation, cause said portable viewer to utilize said printer data to display a desired portion of said one or more documents.

10. A paperless printing system according to claim 9, further comprising:

said data processing system;

a paperless printer including said docking station and said portable viewer;

a printer driver residing in said data processing system and associated with said paperless printer;

an application in said data processing system, said application including a print function;

an operating system in said data processing system that responds to an invocation of said print function by utilizing said printer driver to generate said printer data.

11. A paperless printing system according to claim 9, wherein said printer port comprises a parallel port of said data processing system.

12. A paperless printing system according to claim 9, wherein said rewritable memory comprises sufficient capacity to store printer data defining at least twenty display pages.

13. A paperless printing system according to claim 9, wherein said portable viewer comprises erase facilities that remove operator-identified printer data from said portable viewer in response to operator activation of said erase facilities.

14. A paperless printing system according to claim 9, wherein:

said portable viewer comprises a processor that compresses said printer data into compressed data; and said rewritable memory stores said compressed data.

15. A paperless printing system according to claim 9, wherein:

said docking station comprises a processor that compresses said printer data into compressed data;

said portable viewer receives said compressed data from said docking station; and said rewritable memory stores said compressed data.

16. A paperless printing system according to claim 9, wherein said portable viewer includes one or more portable energy cells that maintain said printer data in said rewritable memory at least when said portable viewer is not coupled to said docking station.

17. A paperless printing system comprising:

a docking station with means for receiving printer data that defines one or more documents from a data processing system;

a portable viewer that removably couples with said docking station to receive said printer data from said docking station when coupled thereto;

storage means within said portable viewer for storing said printer data;

controls means on said portable viewer; and means, responsive to operator manipulations of said control means, for displaying a desired portion of said one or more documents on said portable viewer.

18. A paperless printing system according to claim 17, further comprising means for generating said printer data in response to an invocation of a print function of an application.

19. A paperless printing system according to claim 18, wherein said means for generating said printer data comprises a printer driver.

* * * * *